United States Patent
Droux et al.

(10) Patent No.: US 9,497,088 B2
(45) Date of Patent: Nov. 15, 2016

(54) METHOD AND SYSTEM FOR END-TO-END CLASSIFICATION OF LEVEL 7 APPLICATION FLOWS IN NETWORKING ENDPOINTS AND DEVICES

(71) Applicant: Oracle International Corporation, Redwood Shores, CA (US)

(72) Inventors: Nicolas G. Droux, Rio Rancho, NM (US); Leonid Grossman, Cupertino, CA (US); Venugopal Vaidhyanathan Iyer, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 605 days.

(21) Appl. No.: 14/013,935

(22) Filed: Aug. 29, 2013

(65) Prior Publication Data
US 2015/0067182 A1    Mar. 5, 2015

(51) Int. Cl.
*H04L 29/08* (2006.01)
*H04L 12/24* (2006.01)

(52) U.S. Cl.
CPC ......... *H04L 41/5096* (2013.01); *H04L 67/322* (2013.01); *H04L 69/321* (2013.01)

(58) Field of Classification Search
CPC ............. H04L 41/5096; H04L 67/322; H04L 69/321; H04L 69/329
USPC ........................................................ 709/228
See application file for complete search history.

(56) References Cited

U.S. PATENT DOCUMENTS

| | | | | |
|---|---|---|---|---|
| 6,553,568 B1 * | 4/2003 | Fijolek | ................... | H04L 29/06 348/E7.071 |
| 6,643,612 B1 * | 11/2003 | Lahat | ...................... | G06F 1/14 702/182 |
| 6,701,342 B1 * | 3/2004 | Bartz | ................. | H04L 41/5003 370/395.21 |

(Continued)

FOREIGN PATENT DOCUMENTS

| | | | | |
|---|---|---|---|---|
| EP | 1049297 A2 | 11/2000 | | |
| EP | 1120979 A1 | 8/2001 | | |
| FI | GB 2375256 A | * 11/2002 | ............. | H04L 29/06 |
| KR | 101026905 B1 | * 4/2011 | ........ | H04M 1/72583 |
| SE | WO 2008091183 A1 | * 7/2008 | ......... | H04L 41/5003 |
| WO | 2006/074380 A2 | 7/2006 | | |
| WO | 2006/109187 A2 | 10/2006 | | |
| WO | WO 2007030186 A2 | * 3/2007 | ......... | H04L 12/4641 |

OTHER PUBLICATIONS

Tripathi, S., Droux, N., Srinivasan, T., and Belgaied, K; "Crossbow: from hardware virtualized NICs to virtualized networks," Proceedings of the 1st ACM workshop on Virtualized infrastructure systems and architectures; Barcelona, Spain; Aug. 17, 2009 (9 pages).

(Continued)

*Primary Examiner* — Kostas Katsikis

(74) *Attorney, Agent, or Firm* — Osha Liang LLP

(57) ABSTRACT

In general, in one aspect, the invention relates to a method for handling connections. The method includes receiving, by an OS, a request from an application to create a connection, wherein the request comprises a connection identifier and a SLA, creating, by the OS, the connection targeting the application in response to the request, and mapping the connection identifier to the SLA. The method further includes receiving data from the application for the connection, generating, by a network protocol stack on the OS, a packet from the data by storing the connection identifier into a plurality of headers of the packet, processing, by the network protocol stack, the packet according to the SLA to obtain a processed packet, and transmitting, by the network protocol stack, the processed packet to the network.

17 Claims, 11 Drawing Sheets

(56) References Cited

U.S. PATENT DOCUMENTS

| | | | |
|---|---|---|---|
| 6,798,751 B1* | 9/2004 | Voit | H04L 47/2408 370/252 |
| 6,973,085 B1* | 12/2005 | Acharya | H04L 49/355 370/352 |
| 7,107,326 B1* | 9/2006 | Fijolek | H04L 61/2015 709/220 |
| 7,600,007 B1 | 10/2009 | Lewis | |
| 8,031,665 B1* | 10/2011 | Dinan | H04W 28/26 370/329 |
| 2002/0099669 A1* | 7/2002 | Lauer | G06Q 10/067 705/80 |
| 2003/0087649 A1* | 5/2003 | Bhatia | H04W 4/02 455/456.1 |
| 2006/0136574 A1* | 6/2006 | Anand | H04L 67/322 709/219 |
| 2007/0117548 A1* | 5/2007 | Fernandez-Alonso | H04L 63/0236 455/414.1 |
| 2008/0239985 A1* | 10/2008 | Karve | H04L 41/0856 370/254 |
| 2012/0198043 A1* | 8/2012 | Hesketh | H04L 29/1265 709/223 |
| 2012/0300706 A1 | 11/2012 | Kahn et al. | |
| 2014/0056149 A1* | 2/2014 | Mani | H04L 12/569 370/235.1 |

OTHER PUBLICATIONS

Oracle Platform Development Studio Developer's Guide Service Interceptor http://docs.oracle.com/cd/E14148_02/wlcp/ocsg41_otn/extension/interceptors.html; Accessed Mar. 27, 2013 (11 pages).

Pekar, A., Fecil'ak, P., Michalko, M., Geritl, J., Reves, M; "SLAmeter—the Evaluator of Network Traffic Parameter," ICETA 2012 10th IEEE International Conference on Emerging eLearning Technologies and Applications; Nov. 8-9, 2012; http://www.iceta.sk/proceedings/Iceta2012_Pekar.pdf (5 pages).

* cited by examiner

METHOD AND SYSTEM FOR END-TO-END CLASSIFICATION OF LEVEL 7 APPLICATION FLOWS IN NETWORKING ENDPOINTS AND DEVICES

BACKGROUND

Modern computer system can host a number of applications that each utilize the network connections on the system. Each application may use the network connection(s) for a different task or service. Further, a single application may perform different tasks and provide different services using the same network connection(s). One feature of modern computer networks is that much of the data encapsulated in packets is frequently ignored or invisible to most intermediary network devices that route packets. As a result, most intermediary network devices treat all packets the same, regardless of the application, task, or service associated with the packet.

SUMMARY

In general, in one aspect, the invention relates to a method for handling connections. The method includes receiving, by an operating system (OS), a first request from an application to create a first connection, wherein the first request comprises a first connection identifier and a first service-level agreement (SLA), creating, by the OS, the first connection targeting the application in response to the first request, and mapping the first connection identifier to the first SLA. The method further includes receiving first data from the application for the first connection, generating, by a network protocol stack on the OS, a first packet from the first data by storing the first connection identifier into a first plurality of headers of the first packet, processing, by the network protocol stack, the first packet according to the first SLA to obtain a first processed packet, and transmitting, by the network protocol stack, the first processed packet to the network.

In general, in one aspect, the invention relates to a non-transitory computer readable medium comprising instructions that, when executed by a computer processor, perform a method for handling connections. The method includes receiving, by an operating system (OS), a first request from an application to create a first connection, wherein the first request comprises a first connection identifier and a first service-level agreement (SLA), creating, by the OS, the first connection targeting the application in response to the first request, and mapping the first connection identifier to the first SLA. The method further includes receiving first data from the application for the first connection, generating, by a network protocol stack on the OS, a first packet from the first data by storing the first connection identifier into a first plurality of headers of the first packet, processing, by the network protocol stack, the first packet according to the first SLA to obtain a first processed packet, and transmitting, by the network protocol stack, the first processed packet to the network.

In general, in one aspect, the invention relates to a system for handling connections. The system includes a computer processor, an operating system (OS) executing on the computer processor, and a network protocol stack. The OS is configured to receive a first request from an application to create a first connection, wherein the first request comprises a first connection identifier and a first service-level agreement (SLA), create the first connection targeting the application in response to the first request, map the first connection identifier to the first SLA, and receive first data from the application for the first connection. The network protocol stack is configured to generate a first packet from the first data by storing the first connection identifier into a first plurality of headers of the first packet, process the first packet according to the first SLA to obtain a first processed packet, and transmit the first processed packet to the network.

Other aspects of the invention will be apparent from the following description and the appended claims.

DETAILED DESCRIPTION

Figure 1:
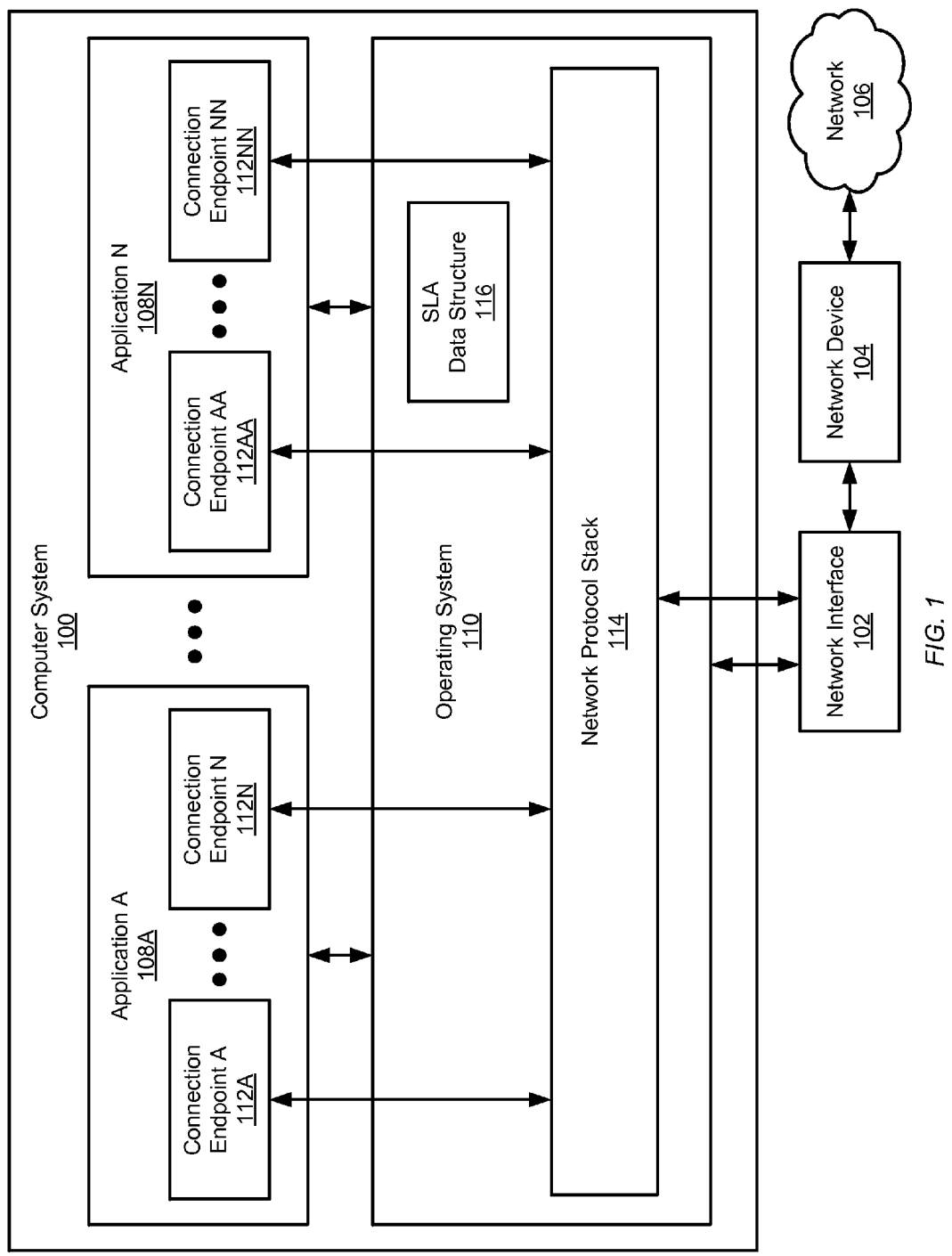
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for dynamic assignment and enforcement of application-driven per-connection service level agreements (SLAs). Specifically, embodiments of the invention may be used to provide applications the ability to set and change the treatment of connections by the hardware and software elements handling the connection. Further, embodiments of the invention may be used to expose processes at lower levels of the network protocol stack to the connection handling instructions set by an application. Further, embodiments of the invention enable an application to set different SLAs for different connections targeting the same application, and have those SLAs enforced by the lower levels of the network protocol stack, network interfaces, and network devices along the path of the connection.

FIG. 1 shows a diagram of a system in accordance with one or more embodiments of the invention. As shown in FIG. 1, the system includes a computer system (100) communicatively coupled to a network interface (102). The network interface (102) provides the computer system (100) access to the network (106) via a network device (104). The computer system includes an operating system (OS) (110) hosting a number of applications (application A (108A), application N (108N)). Each application (application A (108A), application N (108N)) includes one or more connection endpoints (connection endpoint A (112A), connection endpoint N (112N), connection endpoint AA (112AA), connection endpoint NN (112NN)). The OS (110) includes a network protocol stack (114) and a SLA data structure (116).

In one or more embodiments of the invention, the computer system (100) is a group of software and hardware configured to host applications (application A (108A), application N (108N)) using the OS (110). Further details about the computer system (100) are provided in FIG. 8.

In one or more embodiments of the invention, the OS (110) provides an interface for applications (application A (108A), application N (108N)) to access resources on the computer system (100), including processing, storage, and communication resources. In one or more embodiments of the invention, the network protocol stack (114) is a group of processes with functionality to send and receive data on a network. Specifically, the network protocol stack is a set of software layers that prepares outgoing data for transmission on network links as packets and translates incoming packets into data for use by the target application (application A (108A), application N (108N)). In one or more embodiments of the invention, the network protocol stack (114) includes a Transmission Control Protocol (TCP) layer, an Internet Protocol (IP) layer, and a link layer. Further detail regarding the network protocol stack (114) is provided in FIG. 2 and FIG. 3.

In one or more embodiments of the invention, the network interface (102) is a combination of hardware and software with functionality to provides an interface between the computer system (100) and the network (106). The network interface (102) may include an RJ-45 connector, a wireless antenna, or any other wired or wireless interface or any combination thereof. In one or more embodiments of the invention, outgoing packets generated by the network protocol stack (114) are provided to the network interface (102) for transmission on the network (106). In one or more embodiments of the invention, incoming packets from the network (106) are provided to the network protocol stack (114) by the network interface (102).

In one or more embodiments of the invention, the network interface (102) includes functionality to process incoming or outgoing packets. Specifically, the network interface (102) may process incoming packets in preparation for use by the network protocol stack (114) and may process outgoing packets in preparation for transmission on the network device (104). Such processing may be in conjunction with the network protocol stack (114).

In one or more embodiments of the invention, the network interface (102) mirrors some or all of the packet processing functionality of the network protocol stack (114). Specifically, the network interface (102) may include functionality such that some or all of the packet processing performed by the network protocol stack (114) may be offloaded to the network interface (102). In other words, instances of the network protocol stack (114) may exist in whole or in part on the network interface (102). Packets or data generated by the offloaded processing performed by the network interface (102) may be provided to higher layers of the network protocol stack (114) or directly to the OS (110). Outgoing packet processing that is offloaded to the network interface (102) may provide the processed outgoing packets back to the OS (110). Inbound packet processing that is off-loaded to the network interface (102) may provide the resulting data or packets to OS (110) or network protocol stack (114).

In one or more embodiments of the invention, the network device (104) is a computer system or group of computer systems that route packets between and among other computer systems and network devices. In one or more embodiments of the invention, the network device (104) is part of the network (106) and is one of many network devices operating on the network (106). Embodiments of the network device (104) include, but are not limited to, network switches, network routers, and network gateways.

In one or more embodiments of the invention, the network (106) is a group of connected devices with functionality to transmit packets from one device to another. In one or more embodiments of the invention, the network (106) includes computer systems (e.g., computer system (100)) connected by network links to network devices (e.g., network device (104)). The network (106) may be implemented as a local area network or a wide area network, or a combination thereof. Further, the network (106) may include both physical and wireless network links.

In one or more embodiments of the invention, the applications (application A (108A), application N (108N)) are processes or group of processes with functionality to perform a task or set of related tasks for a user of the computer system (100). In one or more embodiments of the invention, the applications (application A (108A), application N (108N)) are server programs configured to service requests from other applications or elements on the network (106). Further, applications (application A (108A), application N (108N)) may be configured to transmit and receive data from other applications or elements using connections provided by the OS (110).

In one or more embodiments of the invention, a connection is a communication link between an application (application A (108A), application N (108N)) and other applications or elements on the same system (e.g., computer system 100) and/or other computer systems (not shown). Connections may be a service provided by the OS (110) allowing applications (application A (108A), application N (108N)) to create a connection endpoint (connection endpoint A (112A), connection endpoint N (112N), connection endpoint AA (112AA), connection endpoint NN (112NN)) that may be used by other applications and/or elements external to the application (application A (108A), application N (108N)). The payload of incoming packets addressed to a connection endpoint (connection endpoint A (112A), connection endpoint N (112N), connection endpoint AA (112AA), connection endpoint NN (112NN)) are routed by the OS (110) to the connection endpoint (connection endpoint A (112A), connection endpoint N (112N), connection endpoint AA (112AA), connection endpoint NN (112NN)) of the application (application A (108A), application N (108N)) associated with the connection.

In one or more embodiments of the invention, each connection has a corresponding connection identifier used by the OS (110) to differentiate connections from one another and to associate a specific connection with an application (application A (108A), application N (108N)). In one or more embodiments of the invention, the connection identifier includes the information necessary to create the connection (e.g., application creating the connection, location of the connection endpoint, etc.) if the connection has not been created. In one or more embodiments of the invention, the connection identifier functions as the source address for outgoing data for the connection and the target address for incoming data on the connection. In one or more embodiments of the invention, a connection is implemented as a network socket that is identified by a network address (e.g., an IP address) and port number.

In one or more embodiments of the invention, the OS (110) creates a connection by generating an association between the connection identifier and the connection target (i.e., the application (application A (108A), application N (108N))) that requested the connection). Once a connection is generated targeting an application (application A (108A), application N (108N)), incoming data addressed to the connection identifier is routed by the OS (110) to the application (application A (108A), application N (108N)) associated with the connection identifier.

In one or more embodiments of the invention, the packets of different connections (such as network sockets) established on the same computer system (100) or by the same OS (110) are generally indistinguishable from one another after they are processed for transmission by an outgoing network protocol stack and before they are received and translated by an incoming network protocol stack. Specifically, connection identifiers of outgoing packets may be rendered unreadable by certain layers of the outgoing network protocol stack (network protocol stack (114)) and network devices (network device (104), and remain unreadable until the equivalent layer of the incoming network protocol stack (network protocol stack (114)) processes the packet. Consequently, lower layers of the network protocol stack (network protocol stack (114)), the network interface (102), and network devices (network device (104)) along the connection may be unable to distinguish one connection from another. In one or more embodiments of the invention, connections, connection endpoints (connection endpoint A (112A), connection endpoint N (112N), connection endpoint AA (112AA), connection endpoint NN (112NN)), and connection identifiers may be constructs used by the application layer (i.e., layer 7) of a protocol stack that includes network protocol stack (114) (i.e., TCP (layer 4), IP (layer 3), and link protocol (layer 4)).

In one or more embodiments of the invention, the SLA data structure (116) maps a connection to a SLA. In one or more embodiments of the invention, a SLA is a set of parameters describing the privileges and limitations to be applied in transmitting and processing the packets of the connection. A SLA may include, for example, a priority, a maximum bandwidth, and a minimum bandwidth. SLA parameters for a priority may include, for example, high, medium, or low. In one or more embodiments of the invention, a high priority SLA parameter indicates that the packets of the associated connection should be processed and/or transmitted ahead of, or more frequently than, packets of other connections. In one or more embodiments of the invention, a low priority SLA parameter indicates that the packets of the associated connection should be processed and/or transmitted behind, or less frequently than, packets of other connections with a higher priority. In one or more embodiments of the invention, a maximum bandwidth SLA parameter indicates the maximum rate at which that the packets of the associated connection should be transmitted. SLA parameters for a maximum or minimum bandwidth include, for example, 0 megabits per second, 10 megabits per second, or 100 gigabits per second. In one embodiment of the invention, SLA parameters (such as priority) may be applied in different ways by different layers and network devices (e.g., network device (104)) along the path of the connection.

In one or more embodiments of the invention, the OS uses the entries in the SLA data structure (116) to implement the SLA for the connection. Specifically, the OS (110) may determine the manner in which the SLA for the connection is applied to packets of the connection. Applying the SLA for a connection may include informing other elements (e.g., network protocol stack, network interface, network device, etc.) along the connection path of the SLA. In one or more embodiments of the invention, the OS (110) may translate the SLA parameters into instructions or requests acceptable by the network protocol stack (114) and other network elements. In one or more embodiments of the invention, each element (e.g., network protocol stack, network interface, network device, etc.) along the connection may implement the SLA in a manner specific to that element. In one or more embodiment of the invention, one or more elements may not support any implementation of the SLA for a connection. In one or more embodiment of the invention, one or more elements may include support for one SLA parameter or range of parameters and lack support for another SLA parameter or range of parameters.

The network protocol stack (114) may, for example, process data for a high priority connection (e.g., connection corresponding to connection endpoint A (112A)) more frequently than data for the other connections (e.g., connections corresponding to connection endpoint N (112N), connection endpoint AA (112AA), and connection endpoint NN (112NN)) on the OS (108). The network interface (102) may, for example, transmit packets from a high priority connection (e.g., connection corresponding to connection endpoint A (112A)) to the network device (104) using a separate buffer from the buffer used for packets of other connections (e.g., connections corresponding to connection endpoint N (112N), connection endpoint AA (112AA), and connection endpoint NN (112NN)) on the OS (108).

In one or more embodiments of the invention, one or more layers of the network protocol stack (114) is configured to detect connection identifiers stored in the packet header associated with that layer. Further, in one or more embodiments of the invention, upon detection of the connection identifier, a layer may be configured to process the packet according to the SLA for the connection identified by the connection identifier. In one or more embodiments of the invention, the layer accesses the SLA data structure (116) to determine the manner in which the packet is to be processed. The network protocol stack (114) may maintain a separate data structure that associates connection identifiers to SLAs (or information describing the SLAs).

In one or more embodiments of the invention, the same SLA or SLA parameter may be enforced differently depending on the enforcing layer. For example, one layer of the network protocol stack (114) may enforce priority using a combination of interrupts and polling, and another layer may enforce priority by allocating resources to processing a packet based on the priority of the packet. In one or more embodiments of the invention, a connection associated with a SLA that includes a combination of SLAs and SLA parameters (e.g., a priority and a maximum bandwidth) may have different SLA parameters enforced by different layers of the network and network protocol stack (114). For example, a maximum bandwidth may be enforced by a link layer, and priority may be enforced by an IP layer.

Figure 2:
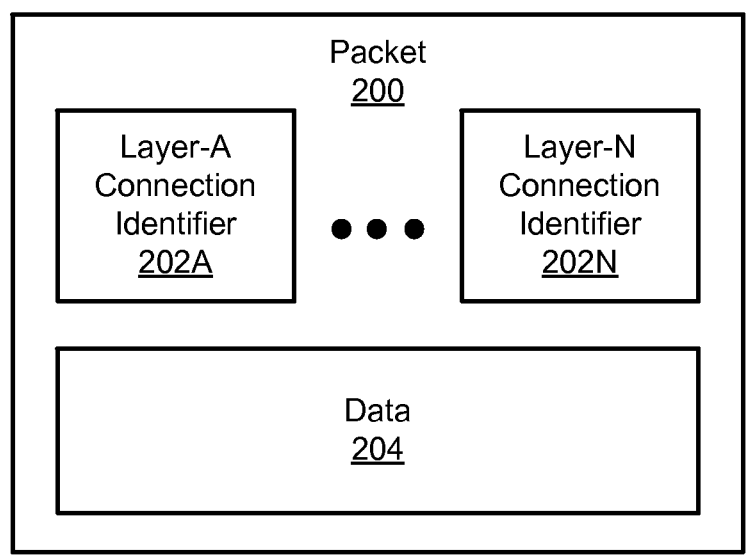
FIG. 2 shows a system in accordance with one or more embodiments of the invention.

FIG. 2 shows a packet in accordance with one or more embodiments of the invention. As shown in FIG. 2, the packet (200) includes a number of layer connection identifiers (layer A connection identifier (202A), layer N connection identifier (202N)) and data (204).

In one or more embodiments of the invention, each layer connection identifier (layer A connection identifier (202A), layer N connection identifier (202N)) is a connection identifier stored in the packet and configured to be accessible by a different network layer protocol. Specifically, each layer connection identifier (layer A connection identifier (202A), layer N connection identifier (202N)) may be accessible using a single network protocol (e.g., TCP, IP, or link protocol) and inaccessible using other network protocols. Further, each layer connection identifier (layer A connection identifier (202A), layer N connection identifier (202N)) may be stored in a different header of the packet (200).

Figure 3:
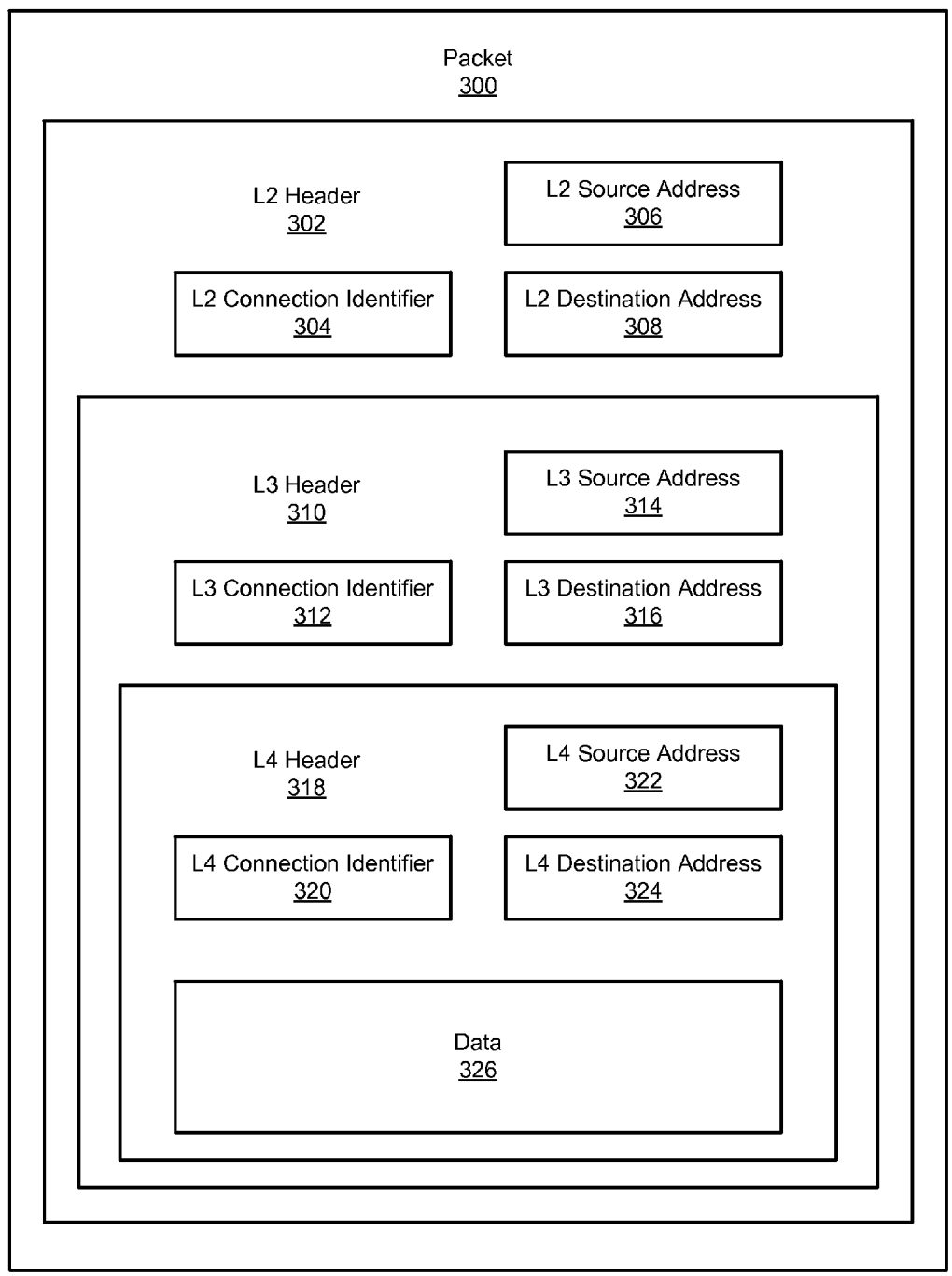
FIG. 3 shows a system in accordance with one or more embodiments of the invention.

FIG. 3 shows a packet in accordance with one or more embodiments of the invention. Specifically, FIG. 3 shows one example implementation of the packet described in FIG. 2. As shown in FIG. 3, the packet (300) includes a layer 2 (L2) header (302). The L2 header (302) includes a L2 connection identifier (304), a L2 source address (306), a L2 destination address (308), and a layer 3 (L3) header (310). The L3 header (310) includes a L3 connection identifier (312), a L3 source address (314), a L3 destination address (316), and a layer 4 (L4) header (318). The L4 header (318) includes a L4 connection identifier (320), a L4 source address (322), a L4 destination address (324), and data (326).

In one or more embodiments of the invention, each header (L2 header (302), L3 header (310), L4 header (318)) includes information used by computer systems and network devices to direct the packet (300) toward the packet destination (e.g., a connection endpoint). In one or more embodiments of the invention, each address (L2 source address (306), L2 destination address (308), L3 source address (314), L3 destination address (316), L4 source address (322), L4 destination address (324)) distinguishes one address from another among devices using the associated layer protocol. In one or more embodiments of the invention, the L2 source address (306) and L2 destination address (308) refer to media access control (MAC) addresses, the L3 source address (314) and L3 destination address (316) refer to IP address, and the L4 source address (322) and L4 destination address (324) refer to TCP ports.

In one or more embodiments of the invention, the data (326) includes the information intended to be communicated by the packet (i.e., the payload of the packet). Further, the data (326) may also include higher-level layer headers (e.g., layer 5 header, layer 6 header, layer 7 header, etc.) corresponding to higher-level packet processing activities. In one or more embodiments of the invention, the connection identifier may be stored in a higher-level layer header, and used as a source or target address (e.g., to provide the packet directly to the associated connection endpoint). Therefore, in one or more embodiments of the invention, a connection identifier (or version of the connection identifier) stored in the lower-level layer headers of the packet is used as a source address or target address at a high-level layer protocol.

In one or more embodiments of the invention, the connection identifiers (L2 connection identifier (304), L3 connection identifier (312), L4 connection identifier (320)) refers to the same higher-level (i.e., layer 5, layer 6, layer 7, etc) connection. In one or more embodiments of the invention, each connection identifier (L2 connection identifier (304), L3 connection identifier (312), L4 connection identifier (320)) is substantially similar to the other connection identifiers (L2 connection identifier (304), L3 connection identifier (312), L4 connection identifier (320)) but for the location at which the connection identifier is stored. Said another way, a single packet (300) may include multiple copies of the same connection identifier (L2 connection identifier (304), L3 connection identifier (312), L4 connection identifier (320)) stored in each header (L2 header (302), L3 header (310), L4 header (318)). In one or more embodiments of the invention, one or more connection identifiers (L2 connection identifier (304), L3 connection identifier (312), L4 connection identifier (320)) are encoded so as to be accessible (i.e., readable) by devices using the associated layer protocol.

In one or more embodiments of the invention, the connection identifiers (L2 connection identifier (304), L3 connection identifier (312), L4 connection identifier (320)) may be used by network devices to distinguish between packets traveling between the same two lower-level address. For example, packets sent from the same source and directed to different connection endpoints on the same computer system may have identical L2 source addresses (L2 source address (306)) and L2 destinations (L2 destination (308)) but different L2 connection identifiers (L2 connection identifier (304)). An L2 device or process may distinguish such packets using the L2 connection identifiers (L2 connection identifier (304)) without accessing the other layer headers (L3 header (310), L4 header (318)) of the packets.

In one or more embodiments of the invention, each connection identifier (L2 connection identifier (304), L3 connection identifier (312), L4 connection identifier (320)) may be stored in the header (L2 header (302), L3 header (310), L4 header (318)) by a process encoding or decoding the packet at the associated layer. In one or more embodiments of the invention, the layer processing the packet may copy the connection identifier (L2 connection identifier (304), L3 connection identifier (312), L4 connection identifier (320)) stored in a higher or lower level header into the header for the current layer. For example, a L2 process may receive an outgoing packet that includes an L3 header (310), and generate the L2 connection identifier (304) by reading the L3 connection identifier (312) stored in the L3 header (310). In one or more embodiments of the invention, the connection identifier is provided by the OS directly.

Figure 4:
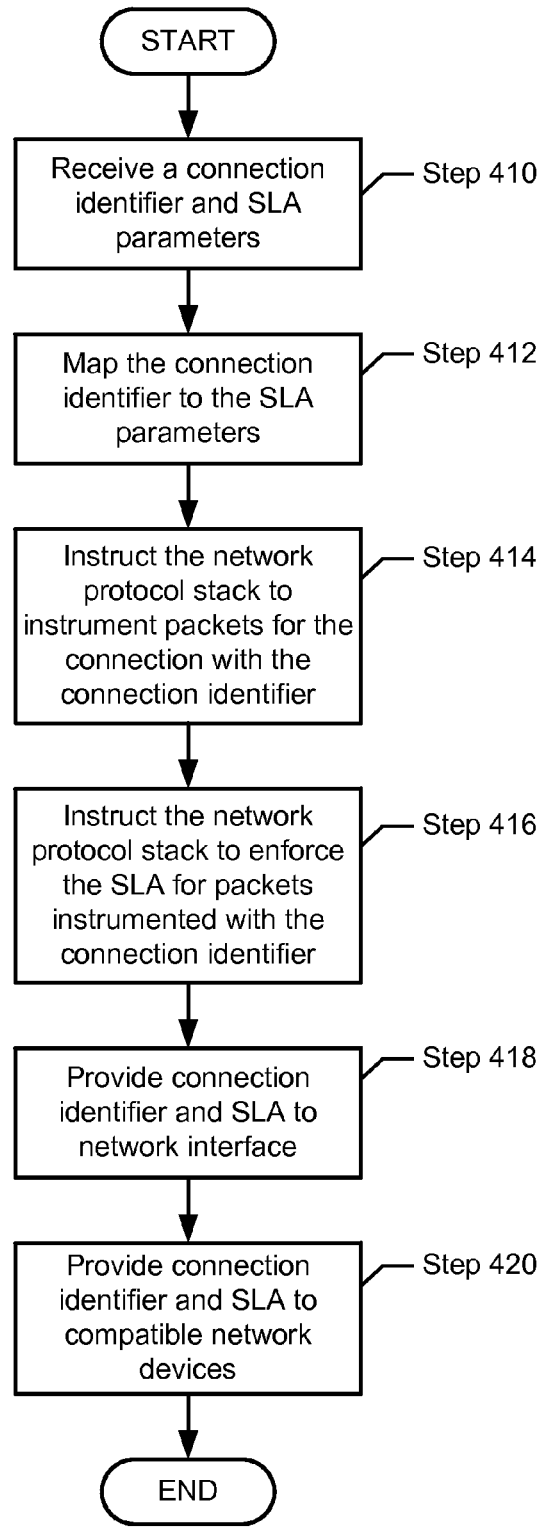
FIG. 4 shows a flow diagram in accordance with one or more embodiments of the invention.

FIG. 4 shows a flowchart for associating a SLA with a connection in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 410, the OS receives a connection identifier and SLA parameters. In Step 412, the OS maps the connection identifier to the SLA parameters. In one or more embodiments of the invention, the OS maps the connection identifier to the SLA parameters using a SLA data structure. In Step 414, the OS instructs the network protocol stack to instrument packets for the connection with the connection identifier and provides the connection identifier to the one or more layers of the network protocol stack. In one or more embodiments of the invention, instrumenting a packet with a connection identifier includes storing the connection identifier (or a variation thereof) in one or more headers of the packet. In one or more embodiments of the invention, lower layers are configured to detect a connection identifier in the header of higher-level layers and store a corresponding connection identifier in the lower-level header.

In Step 416, the OS instructs the network protocol stack to enforce the SLA for packets instrumented with the connection identifier. In one or more embodiments of the invention, one or more layers of the network protocol stack is configured to detect a connection identifier in the associated layer, determine a SLA mapped to the connection identifier, and enforce the SLA during the processing of the packet.

In Step 418, the OS provides the connection identifier to the network interface. In one or more embodiments of the invention, the network interface is configured to detect a connection identifier in an incoming packet (e.g., L2 connection identifier), determine a SLA mapped to the connection identifier, and enforce the SLA during the processing of the packet. In one or more embodiments of the invention, the network interface stores the SLA mapped to the connection identifier in a data structure on the network interface.

In Step 420, the OS provides the connection identifier and SLA to compatible network devices. In one or more embodiments of the invention, the OS determines whether a network device includes the functionality to enforce a SLA by querying the network device to receive the network device's capabilities. In one or more embodiments of the invention, the network interface and/or network devices are configured to propagate a connection identifier and SLA mapping to one or more other network device attached to the network interface or network device.

Figure 5:
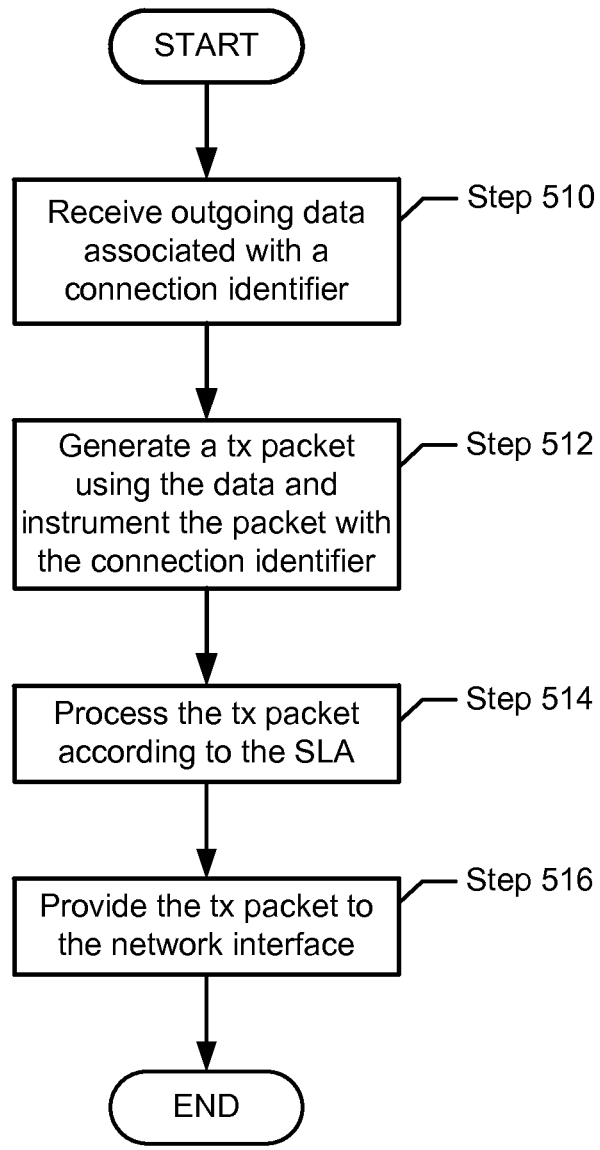
FIG. 5 shows a flow diagram in accordance with one or more embodiments of the invention.

FIG. 5 shows a flowchart for sending data on a connection in accordance with one or more embodiments of the invention. While the various steps the flowchart are presented and described sequentially, one of ordinary skill will appreciate that some or all of the steps may be executed in different orders, may be combined or omitted, and some or all of the steps may be executed in parallel.

In Step 510, the network protocol stack receives outgoing data associated with the connection identified by the connection identifier. In Step 512, the network protocol stack generates a transmission (tx) packet using the data and instruments the packet with the connection identifier. In one or more embodiments of the invention, processes at one or more layers of the network protocol stack store the connection identifier in the corresponding layer headers. In one or more embodiments of the invention, the connection identifier is stored in all, fewer than all, or a single header of each packet processed by the network protocol stack. In one or more embodiments of the invention, the network interface is configured to perform packet processing in conjunction with, or addition to, the processing performed by the network protocol stack (i.e., processing of packets for a connection may be offloaded to the network interface). In one or more embodiments of the invention, the network interface is instructed to instrument tx packets for the connection with the connection identifier. Based on the instruction, the network interface processes the data at using one or more layers of the network protocol stack and stores the connection identifier in one or more layer headers.

In Step 514, the local network protocol stack (and/or the network interface) processes the tx packets according to the SLA mapped to the connection identifier. In one or more embodiments of the invention, Step 512 and Step 514 are repeated for a number of layers in the network protocol stack. In Step 516, the network protocol stack provides the tx packets to the network interface and/or the network interface provides the tx packets to a network device (i.e., next hop device).

Figure 6:
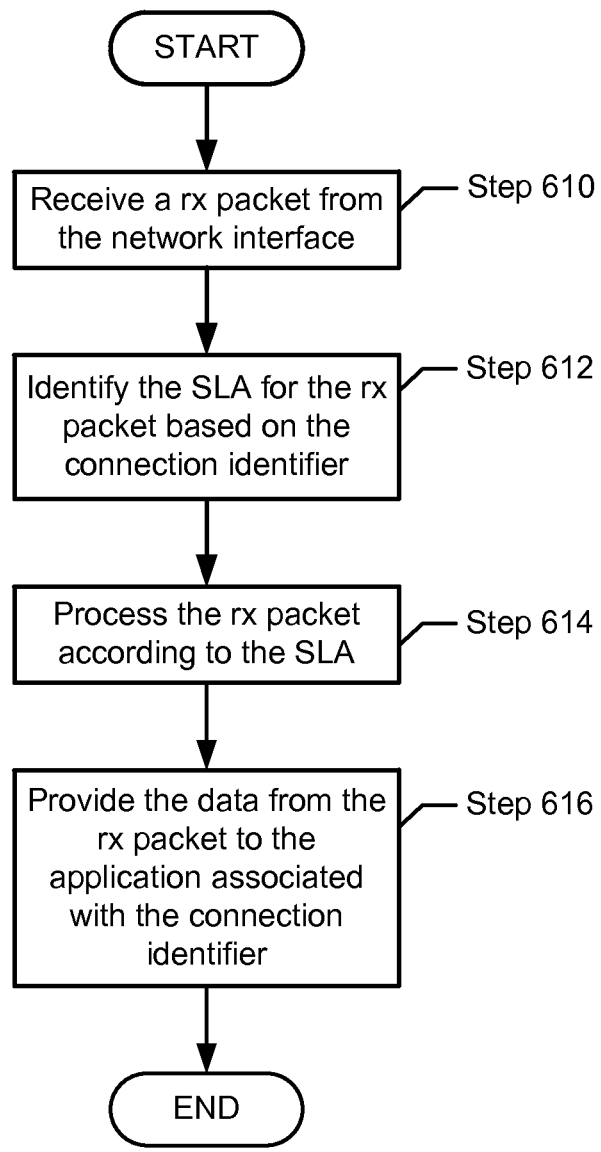
FIG. 6 shows a flow diagram in accordance with one or more embodiments of the invention.

FIG. 6 shows a flowchart for receiving data on a connection in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 610, the network protocol stack (within the OS or on the network interface) receives a received (rx) packet from the network interface or network. In Step 612, the network protocol stack detects the connection identifier in one or more layer headers of the rx packet and identifies a SLA mapped to the connection identifier. In Step 614, the network protocol stack processes the rx packet according to the SLA mapped to the connection identifier. In Step 616, the network protocol stack provides the data (i.e., packet payload) from the rx packet to the application associated with the connection identifier.

Figure 7A:
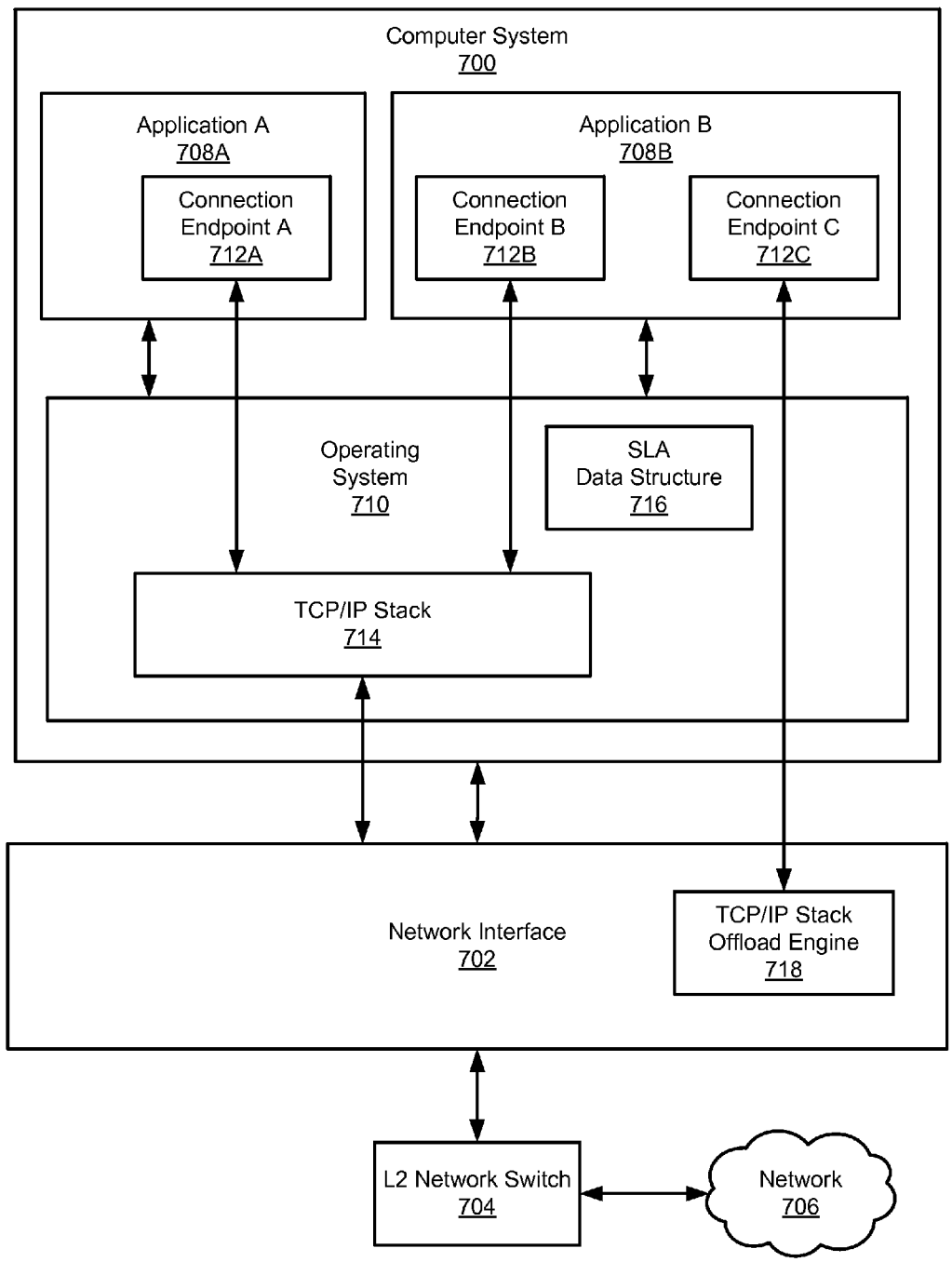
FIGS. 7A-7D show an example in accordance with one or more embodiments of the invention.

FIGS. 7A-7D show an example in accordance with one or more embodiments of the invention. Specifically, FIG. 7A shows an example system in accordance with one or more embodiments of the invention. As shown in FIG. 7A, the example system includes a computer system (700) communicatively coupled to a network interface (702). The network interface (702) provides the computer system (700) access to the network (706) via a L2 network switch (704). The L2 network switch (704) is a network device that routes packets based on information in the L2 header of the packet. The computer system includes an OS (710) hosting application A (708A) and application B (708B). Application A (708A) includes connection endpoint A (712A) and application B (708B) includes connection endpoint B (712B) and connection endpoint C (712C). The OS (710) includes a TCP/IP stack (714) and a SLA data structure (716). The network interface (702) includes a TCP/IP stack offload engine (718).

Assume for the purposes of the example, that the TCP/IP stack (714) includes TCP (L2), IP (L3), and link layer (L4) packet processing functionality. Assume also that the TCP/IP stack offload engine (718) also includes TCP (L2), IP (L3), and link layer (L4) packet processing functionality. Assume further that L2 network switch (704) includes functionality to route packets with a high priority ahead of all other packets. Assume that the OS operates under a system policy dictating that connections with a SLA indicating a low priory are offloaded from the TCP/IP stack (714) to the TCP/IP stack offload engine (718) on the network interface (702). Finally, assume that the computer system (700) is associated with a single MAC address: "12:34:00:00:ce:01" and a single IP address: "98.76.0.1".

Figure 7B:
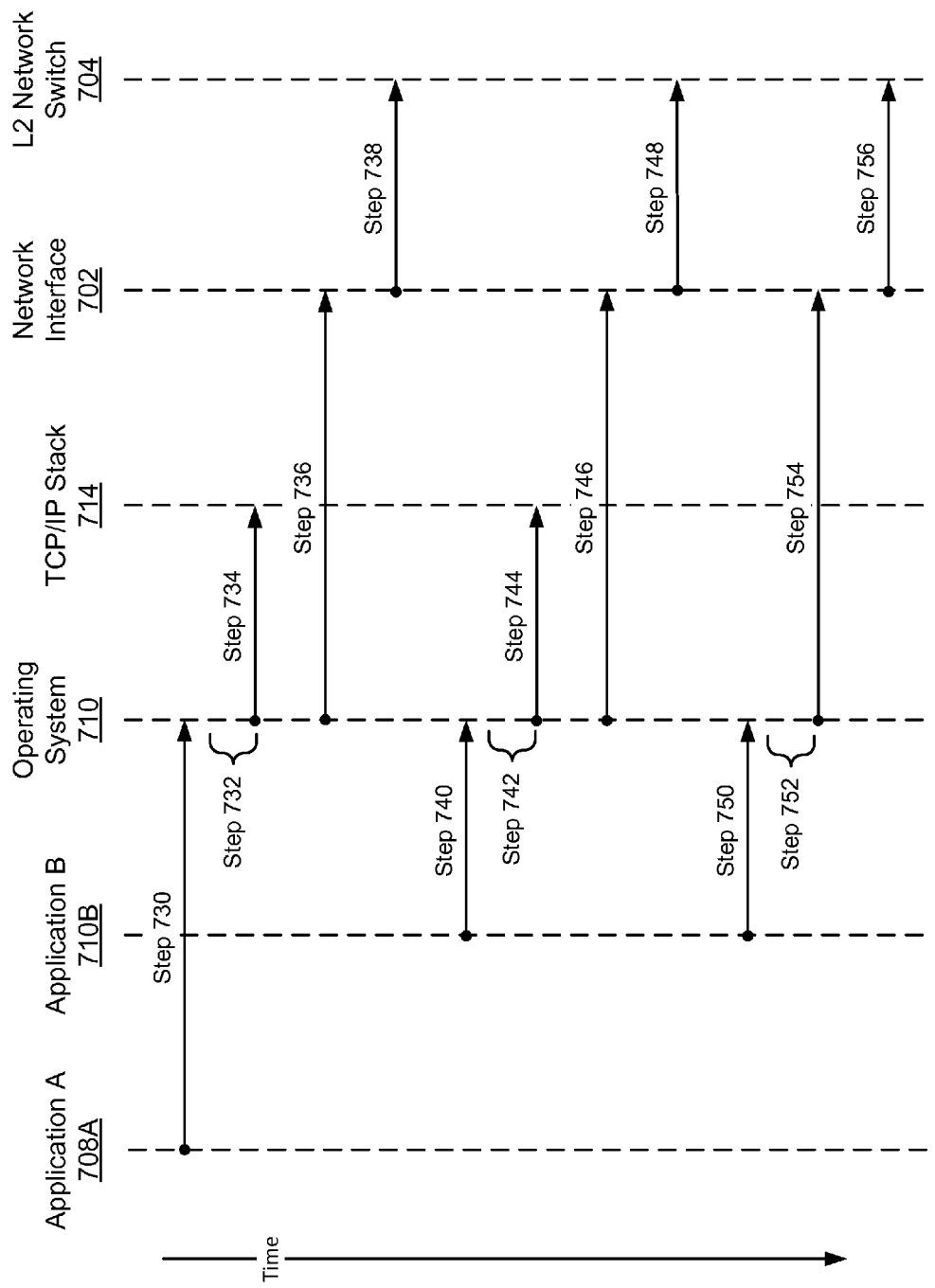

FIG. 7B shows an example timeline in accordance with one or more embodiments of the invention. In Step 730, application A (708A) sends a request to the OS (710) to create connection endpoint A (712A) with the connection identifier (i.e., port number) "1001" and a SLA parameter indicating a priority of medium. In Step 732, the OS (710) creates connection endpoint A (712A) targeting application A (708A) and stores the connection identifier, "1001", in the SLA data structure (716) mapped to a priority of medium.

In Step 734, the OS (710) instructs the TCP/IP stack (714) to process packets to and from connection endpoint A (712A) with a medium priority. In Step 736, the OS (710) instructs the network interface (702) to instruct all connected network devices, if they include the compatible functionality, to process packets to and from connection endpoint A (712A) with a medium priority. In Step 738, the L2 network switch (704) receives the instruction but is not configured to distinguish medium priority packets from other packets, and dismisses the instruction. Also in response to Step 738, the L2 network switch (704) forwards the instruction to all other connected network devices.

In Step 740, application B (708B) sends a request to the OS (710) to create connection endpoint B (712B) with the connection identifier (i.e., port number) "1002" and a SLA parameter indicating a priority of high to the OS (710). In Step 742, the OS (710) creates connection endpoint B (712B) targeting application B (708B) and stores the connection identifier, "1002", in the SLA data structure (716) mapped to a priority of high.

In Step 744, the OS (710) instructs the TCP/IP stack (714) to process packets to and from connection endpoint B (712B) with a high priority. In Step 746, the OS (710) instructs the network interface (702) to transmit packets to and from connection endpoint B (712B) with a high priority. Also in Step 746, the OS (710) instructs the network interface (702) to instruct all connected network devices, if they include the compatible functionality, to process packets to and from connection endpoint B (712B) with a high priority. In Step 748, the L2 network switch (704) receives the instruction and stores the connection identifier mapped to a priority of high in a local data structure. Also in response to Step 748, the L2 network switch (704) forwards the instruction to all other connected network devices.

In Step 750, application B (708B) sends a request to the OS (710) to create connection endpoint C (712C) with the connection identifier (i.e., port number) "1003" and a SLA parameter indicating a priority of low to the OS (710). In Step 752, the OS (710) creates connection endpoint C (712C) and stores the connection identifier, "1003", in the SLA data structure (716) mapped to a priority of low.

In Step 752, the OS (710) determines that, according to the system policy, connections with a SLA indicating a low priory are offloaded from the TCP/IP stack (714) to the TCP/IP stack offload engine (718) on the network interface (702). In Step 754, the OS (710) instructs the network interface (702) to process packets to and from connection endpoint C (712C) on the TCP/IP stack offload engine (718). Also in Step 754, the OS (710) instructs the network interface (702) to instruct all connected network devices, if they include the compatible functionality, to process packets to and from connection endpoint C (712C) with a low priority. In Step 756, the L2 network switch (704) receives the instruction but is not configured to distinguish low priority packets from other packets, and dismisses the instruction. Also in response to Step 756, the L2 network switch (704) forwards the instruction to all other connected network devices.

Figure 7C:
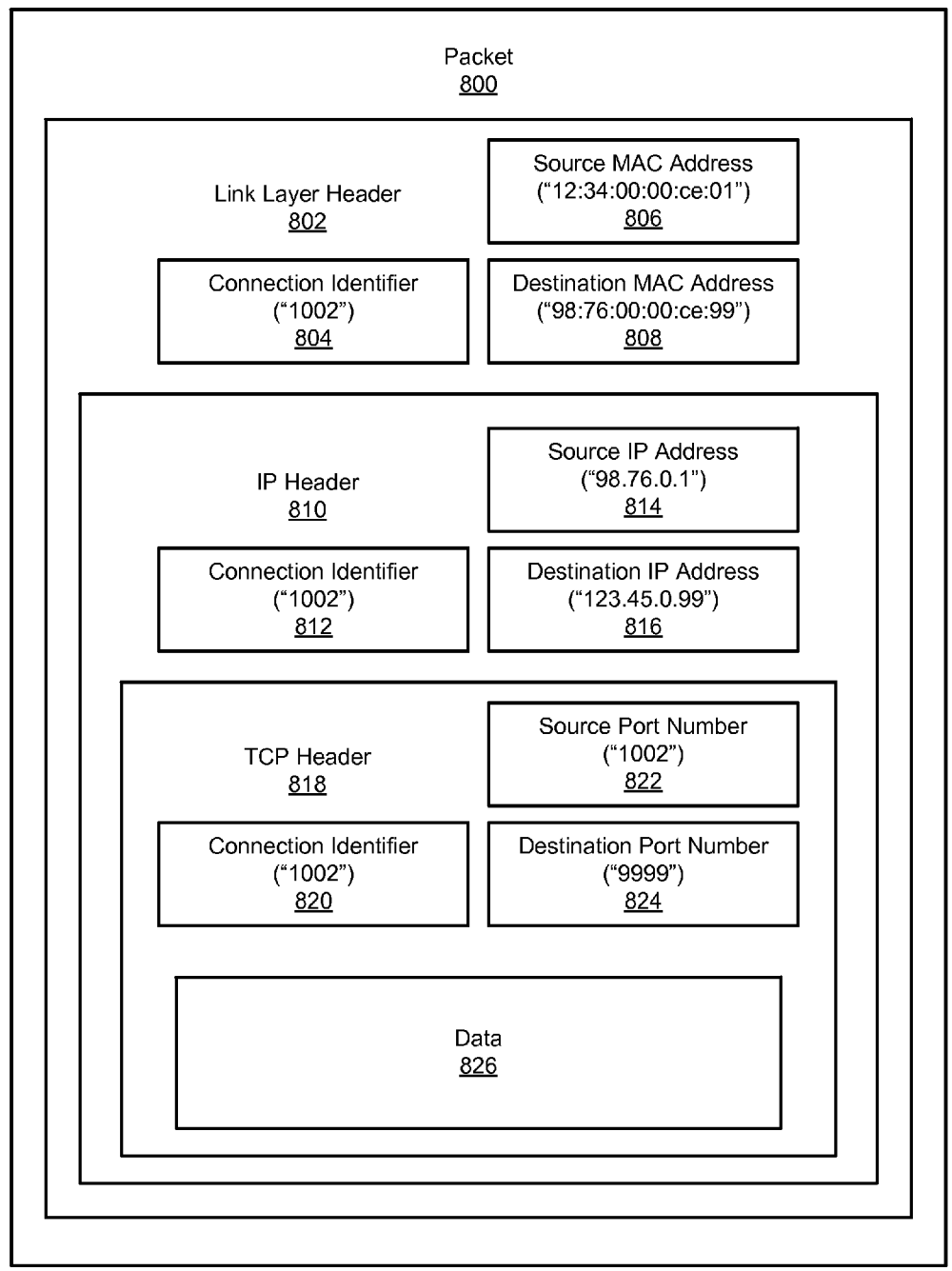

FIG. 7C shows an example tx packet in accordance with one or more embodiments of the invention. Specifically, FIG. 7C shows a packet generated by the TCP/IP stack (714) sent by application B (708B) using connection endpoint B (712B). The packet (800) is addressed to port "9999" on a system with the IP address "123.45.0.99" and the MAC address "98:76:00:00:ce:99". As shown in FIG. 7C, the packet (800) includes a link layer header (802). The link layer header (802) includes the connection identifier ("1002") (804), the source MAC address ("12:34:00:00:ce:01") (806), the destination MAC address ("98:76:00:00:ce:99") (808), and an IP header (810). The IP header (810) includes the connection identifier ("1002") (812), the source IP address ("98.76.0.1") (814), the destination IP address ("123.45.0.99") (816), and a TCP header (818). The TCP header (818) includes the connection identifier ("1002") (820), the source port number ("1002") (822), the destination port number ("9999") (824), and data (826).

Figure 7D:
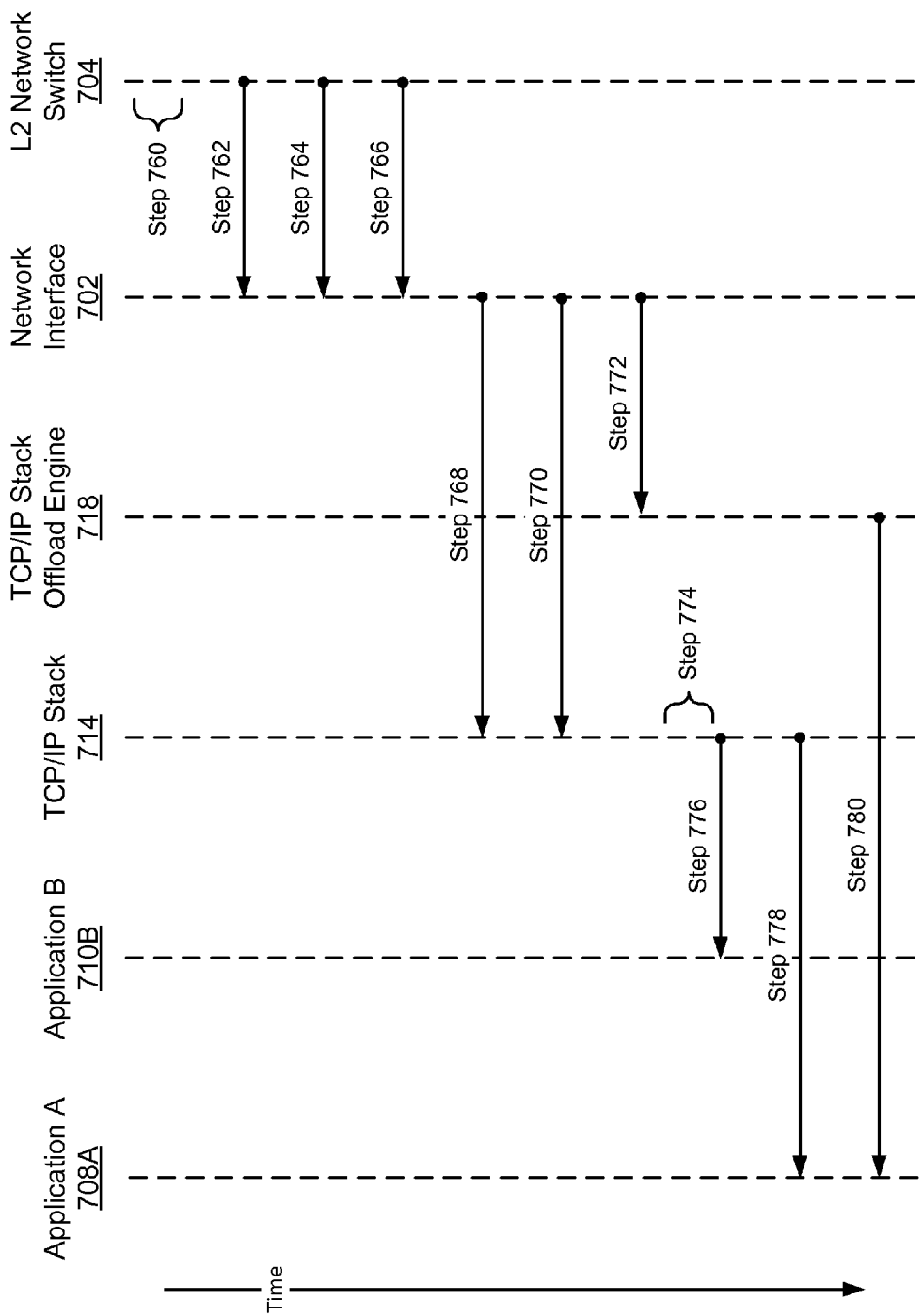

FIG. 7D shows an example timeline in accordance with one or more embodiments of the invention. Specifically, FIG. 7D shows a timeline continuation of the timeline shown in FIG. 7B. In Step 760, the L2 network switch (704) receives, from the network (706), packets targeting connection endpoint A (712A), packets targeting connection endpoint B (712B), and packets targeting connection endpoint C (712C). Also in Step 760, the L2 network switch (704) reads the connection identifier in the link layer header of each packet, compares the connection identifier to a local data structure, and determines that packets containing a connection identifier corresponding to "1002" are to be given priority over other packets. In Step 762, L2 network switch (704) transmits the packets containing the connection identifier "1002" in the link layer header to the network interface (702) first. The L2 network device (704) determines that no other packets contain the connection identifier "1002" in the link layer header, and transmits the remaining packets in the order they were received from the network. In Step 764, the packets for connection endpoint A (712A) are transmitted to the network interface (702). In Step 766, the L2 network device (704) transmits the packets for connection endpoint C (712C) to the network interface (702).

In Step 768, the network interface (702) reads the connection identifier "1001" in the link layer header of the packets for connection endpoint A (712A), compares the connection identifier "1001" to a local data structure, and determines that the packets with the connection identifier "1001" in the link layer header should be sent to the TCP/IP stack (714) for processing. In Step 770, the network interface (702) reads the connection identifier "1002" in the link layer header of the packets for connection endpoint B (712B), compares the connection identifier "1002" to a local data structure, and determines that the packets with the connection identifier "1002" in the link layer header should be sent to the TCP/IP stack (714) for processing.

In Step 772, the network interface (702) reads the connection identifier "1003" in the link layer header of the packets for connection endpoint C (712C), compares the connection identifier "1003" to a local data structure, and determines that the packets with the connection identifier "1002" in the link layer header should processed locally on the TCP/IP stack offload engine (718).

In Step 774, the TCP/IP stack (714) receives the packets for connection endpoint A (712A) and connection endpoint B (712B). The link layer within the TCP/IP stack (714) reads the link layer header of the packets for connection endpoint A (712A) and connection endpoint B (712B), and compares the connection identifiers to the mappings stored in the SLA data structure (716). The link layer then processes the packets containing the connection identifier "1002" in the link layer header with a high priority (e.g., dedicating more threads to processing the packets), and processes the packets containing the connection identifier "1001" in the link layer header with a medium priority (e.g., dedicating fewer threads to processing the packets). Also at Step 774, the IP layer reads the IP header of the packets for connection endpoint A (712A) and connection endpoint B (712B), and compares the connection identifiers in the IP header to the mappings stored in the SLA data structure (716). The IP layer then processes the packets containing the connection identifier "1002" in the IP header with a high priority (e.g., dedicating more threads to processing the packets), and processes the packets containing the connection identifier "1001" in the IP header with a medium priority (e.g., dedicating fewer threads to processing the packets). Also at Step 774, the TCP layer reads the TCP header of the packets for connection endpoint A (712A) and connection endpoint B (712B), and compares the connection identifiers to the mappings stored in the SLA data structure (716). The TCP layer then processes the packets containing the connection identifier "1002" in the TCP layer header with a high priority (e.g., dedicating more threads to processing the packets), and processes the packets containing the connection identifier "1001" in the TCP layer header with a medium priority (e.g., dedicating fewer threads to processing the packets).

In Step 776, the TCP/IP stack (714) sends the packets for connection endpoint B (712B) to application B (708B). In Step 778, the TCP/IP stack (714) sends packets for connection endpoint A (712A) to application A (708A). In Step 780, the TCP/IP stack offload engine (718) sends the packets for connection endpoint C (712C) to application B (708B).

Figure 8:
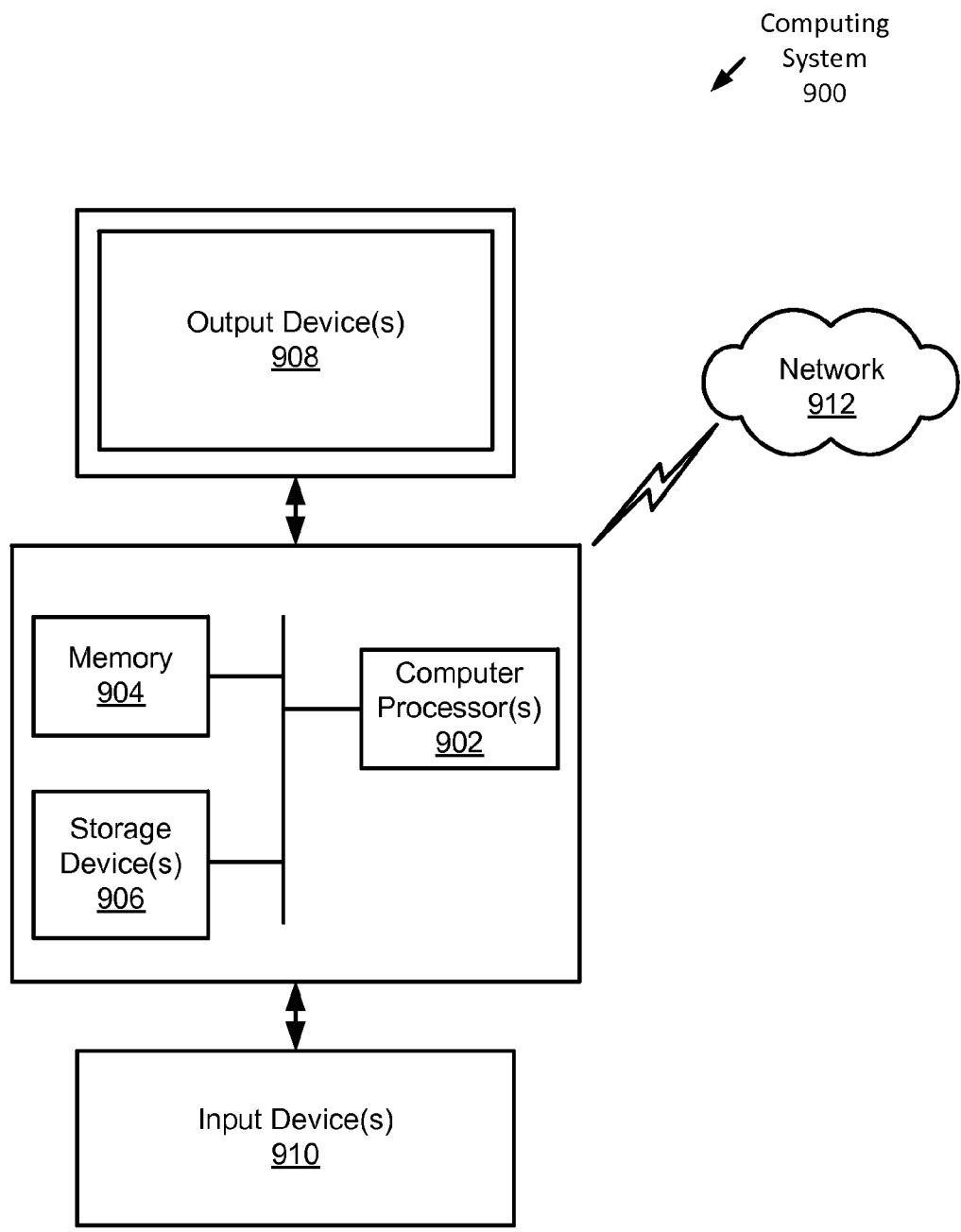
FIG. 8 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 8, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and connected to the other elements over a network (912). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for handling connections comprising:
   receiving, by an operating system (OS), a first request from an application to create a first connection, wherein the first request comprises a first connection identifier and a first service-level agreement (SLA);
   creating, by the OS, the first connection targeting the application in response to the first request;
   mapping the first connection identifier to the first SLA;
   receiving first data from the application for the first connection;
   generating, by a network protocol stack on the OS, a first packet from the first data by storing the first connection identifier into a first plurality of headers of the first packet;
   processing, by the network protocol stack, the first packet according to the first SLA to obtain a first processed packet;
   transmitting, by the network protocol stack, the first processed packet to the network;
   receiving, by the network protocol stack, a second packet from the network;
   detecting, by the network protocol stack, the first connection identifier in the first plurality of headers of the second packet;
   comparing the first connection identifier to a plurality of entries in a SLA data structure to determine the first SLA mapped to the first connection identifier;
   processing, by the network protocol stack in response to the comparing, the second packet according to the first SLA to obtain a second processed packet; and
   providing, by the OS, the second processed packet to the application.

2. The method of claim 1, further comprising:
   receiving, by the OS, a second request from the application to create a second connection, wherein the second request comprises a second connection identifier and a second SLA;
   creating, by the OS, the second connection targeting the application in response to the second request;
   mapping the second connection identifier to the second SLA;
   receiving second data from the application for the second connection;
   generating, by the network protocol stack, a third packet from the second data by storing the second connection identifier into a second plurality of headers of the third packet;
   processing, by the network protocol stack, the third packet according to the second SLA to obtain a second third processed packet; and
   transmitting, by the network protocol stack, the third processed packet to the network.

3. The method of claim 2, further comprising:
receiving, by the network protocol stack, a fourth packet from the network;
detecting, by the network protocol stack, the first connection identifier in a third plurality of headers of the fourth packet;
comparing the first connection identifier to the plurality of entries in the SLA data structure to determine the first SLA mapped to the first connection identifier;
processing, by the network protocol stack in response to the determination that the first SLA is mapped to the first connection identifier, the fourth packet according to the first SLA to obtain a fourth processed packet; and
providing, by the OS, the fourth processed packet to the application.

4. The method of claim 3, further comprising:
receiving, by the network protocol stack, a fifth packet from the network;
detecting, by the network protocol stack, the second connection identifier in a fourth plurality of headers of the fifth packet;
comparing the second connection identifier to the plurality of entries in the SLA data structure to determine the second SLA mapped to the second connection identifier;
processing, by the network protocol stack in response to the determination that the second SLA is mapped to the second connection identifier, the fifth packet according to the second SLA to obtain a fifth processed packet; and
providing, by the OS, the fifth processed packet to the application.

5. The method of claim 1, wherein storing the first connection identifier into the first plurality of headers of the first packet comprises storing the first connection identifier in one selected from a group consisting of a layer 2 header, a layer 3 header, and a layer 4 header.

6. The method of claim 1, further comprising:
instructing, by the OS, a network interface to process packets comprising the first connection identifier according to the first SLA.

7. A non-transitory computer readable medium comprising instructions that, when executed by a computer processor, perform a method for handling connections, the method comprising:
receiving, by an operating system (OS), a first request from an application to create a first connection, wherein the first request comprises a first connection identifier and a first service-level agreement (SLA);
creating, by the OS, the first connection targeting the application in response to the first request;
mapping the first connection identifier to the first SLA;
receiving first data from the application for the first connection;
generating, by a network protocol stack on the OS, a first packet from the first data by storing the first connection identifier into a first plurality of headers of the first packet;
processing, by the network protocol stack, the first packet according to the first SLA to obtain a first processed packet;
transmitting, by the network protocol stack, the first processed packet to the network;
receiving, by the network protocol stack, a second packet from the network;
detecting, by the network protocol stack, the first connection identifier in the first plurality of headers of the second packet;
comparing the first connection identifier to a plurality of entries in a SLA data structure to determine the first SLA mapped to the first connection identifier;
processing, by the network protocol stack in response to the comparing, the second packet according to the first SLA to obtain a second processed packet; and
providing, by the OS, the second processed packet to the application.

8. The non-transitory computer readable medium of claim 7, the method further comprising:
instructing, by the OS, a network interface to process packets comprising the first connection identifier according to the first SLA.

9. The non-transitory computer readable medium of claim 7, the method further comprising:
receiving, by the OS, a second request from the application to create a second connection, wherein the second request comprises a second connection identifier and a second SLA;
creating, by the OS, the second connection targeting the application in response to the second request;
mapping the second connection identifier to the second SLA;
receiving second data from the application for the second connection;
generating, by the network protocol stack, a third packet from the second data by storing the second connection identifier into a second plurality of headers of the third packet;
processing, by the network protocol stack, the third packet according to the second SLA to obtain a third processed packet; and
transmitting, by the network protocol stack, the third processed packet to the network.

10. The non-transitory computer readable medium of claim 9, the method further comprising:
receiving, by the network protocol stack, a fourth packet from the network;
detecting, by the network protocol stack, the first connection identifier in a third plurality of headers of the fourth packet;
comparing the first connection identifier to the plurality of entries in the SLA data structure to determine the first SLA mapped to the first connection identifier;
processing, by the network protocol stack in response to the determination that the first SLA is mapped to the first connection identifier, the fourth packet according to the first SLA to obtain a fourth processed packet; and
providing, by the OS, the fourth processed packet to the application.

11. The non-transitory computer readable medium of claim 10, the method further comprising:
receiving, by the network protocol stack, a fifth packet from the network;
detecting, by the network protocol stack, the second connection identifier in a fourth plurality of headers of the fifth packet;
comparing the second connection identifier to the plurality of entries in the SLA data structure to determine the second SLA mapped to the second connection identifier;
processing, by the network protocol stack in response to the determination that the second SLA is mapped to the second connection identifier, the fifth packet according to the second SLA to obtain a fifth processed packet; and providing, by the OS, the fifth processed packet to the application.

12. The non-transitory computer readable medium of claim 7, wherein storing the first connection identifier into the first plurality of headers of the first packet comprises storing the first connection identifier in one selected from a group consisting of a layer 2 header, a layer 3 header, and a layer 4 header.

13. A system for handling connections comprising:
a computer processor; and
a memory comprising:
an operating system (OS), which when executed on the computer processor:
receives a first request from an application to create a first connection, wherein the first request comprises a first connection identifier and a first service-level agreement (SLA);
creates the first connection targeting the application in response to the first request;
maps the first connection identifier to the first SLA; and
receives first data from the application for the first connection; and
a network protocol stack configured to:
generate a first packet from the first data by storing the first connection identifier into a first plurality of headers of the first packet;
process the first packet according to the first SLA to obtain a first processed packet;
transmit the first processed packet to the network;
receive a second packet from the network;
detect the first connection identifier in the first plurality of headers of the second packet;
compare the first connection identifier to a plurality of entries in a SLA data structure to determine the first SLA mapped to the first connection identifier; and
process, in response to the comparing, the second packet according to the first SLA to obtain a second processed packet,
wherein the OS further:
provides the second processed packet to the application.

14. The system of claim 13,
wherein the OS further:
receives a second request from the application to create a second connection, wherein the second request comprises a second connection identifier and a second SLA;
creates the second connection targeting the application in response to the first request;
maps the second connection identifier to the second SLA; and
receives second data from the application for the second connection, and
wherein the network protocol stack is further configured to:
generate a third packet from the second data by storing the second connection identifier into a second plurality of headers of the third packet;
process the third packet according to the second SLA to obtain a third processed packet; and
transmit the third processed packet to the network.

15. The system of claim 14,
wherein the network protocol stack is further configured to:
receive a fourth packet from the network;
detect the first connection identifier in a third plurality of headers of the fourth packet;
compare the first connection identifier to the plurality of entries in the SLA data structure to determine the first SLA mapped to the first connection identifier;
process, in response to the determination that the first SLA is mapped to the first connection identifier, the fourth packet according to the first SLA to obtain a fourth processed packet, and
wherein the OS is further configured to:
provide the fourth processed packet to the application.

16. The system of claim 15, further comprising:
wherein the network protocol stack is further configured to:
receive a fifth packet from the network;
detect the second connection identifier in a fourth plurality of headers of the fifth packet;
compare the second connection identifier to the plurality of entries in the SLA data structure to determine the second SLA mapped to the second connection identifier;
process, in response to the determination that the second SLA is mapped to the second connection identifier, the fifth packet according to the second SLA to obtain a fifth processed packet, and
wherein the OS further:
provides the fifth processed packet to the application.

17. The system of claim 13, wherein storing the first connection identifier into the first plurality of headers of the first packet comprises storing the first connection identifier in one selected from a group consisting of a layer 2 header, a layer 3 header, and a layer 4 header.

* * * * *

UNITED STATES PATENT AND TRADEMARK OFFICE
CERTIFICATE OF CORRECTION

PATENT NO. : 9,497,088 B2  
APPLICATION NO. : 14/013935  
DATED : November 15, 2016  
INVENTOR(S) : Droux et al.

Page 1 of 1

It is certified that error appears in the above-identified patent and that said Letters Patent is hereby corrected as shown below:

In the Claims

In Column 14, Line 64, in Claim 2, after "obtain a" delete "second".

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*